United States Patent

[11] 3,594,036

| [72] | Inventor | Jean G. Cadiou |
| | | Paris, France |
| [21] | Appl. No. | 827,800 |
| [22] | Filed | May 26, 1969 |
| [45] | Patented | July 20, 1971 |
| [73] | Assignee | Societe Anonyme Andre Citroen |
| | | Paris, France |
| [32] | Priority | May 30, 1968 |
| [33] | | France |
| [31] | | 3,510 |

[54] VEHICLES WITH SLIDING DOORS
3 Claims, 5 Drawing Figs.

[52] U.S. Cl.............................................. 296/155,
296/153
[51] Int. Cl........................................... B60j 5/06
[50] Field of Search............................. 296/155,
153, 146, 68

[56] References Cited
UNITED STATES PATENTS

| 2,548,950 | 4/1951 | Coles | 296/155 |
| 2,622,919 | 12/1952 | Scott | 296/155 |
| 2,955,872 | 10/1960 | Barenyi | 296/155 |
| 3,155,421 | 11/1964 | Barenyi | 296/153 |

*Primary Examiner*—Benjamin Hersh
*Assistant Examiner*—Robert R Song
*Attorney*—Karl F Ross ABSTRACT: A vehicle with a sliding door or doors in which a hollow, quadrilateral frame in which said door is slidable is manufactured separately from the remainder of the vehicle, being fixed to the vehicle body after completion of the latter and preferably after the equipping of the frame with all necessary runners, latch members and the like fittings for the door and possible after the insertion of the door or doors into the frame.

According to another feature of the invention the opening movement of a sliding door lifts an armrest from a normal to a raised position, the armrest pivotting on a pillar fixed to the floor of the vehicle. Preferably the armrest forms with a member fixed thereto a fork in which a finger projecting from the door engages when the door is opened, thus ensuring that the armrest returns from its raised to its normal position as the door is closed.

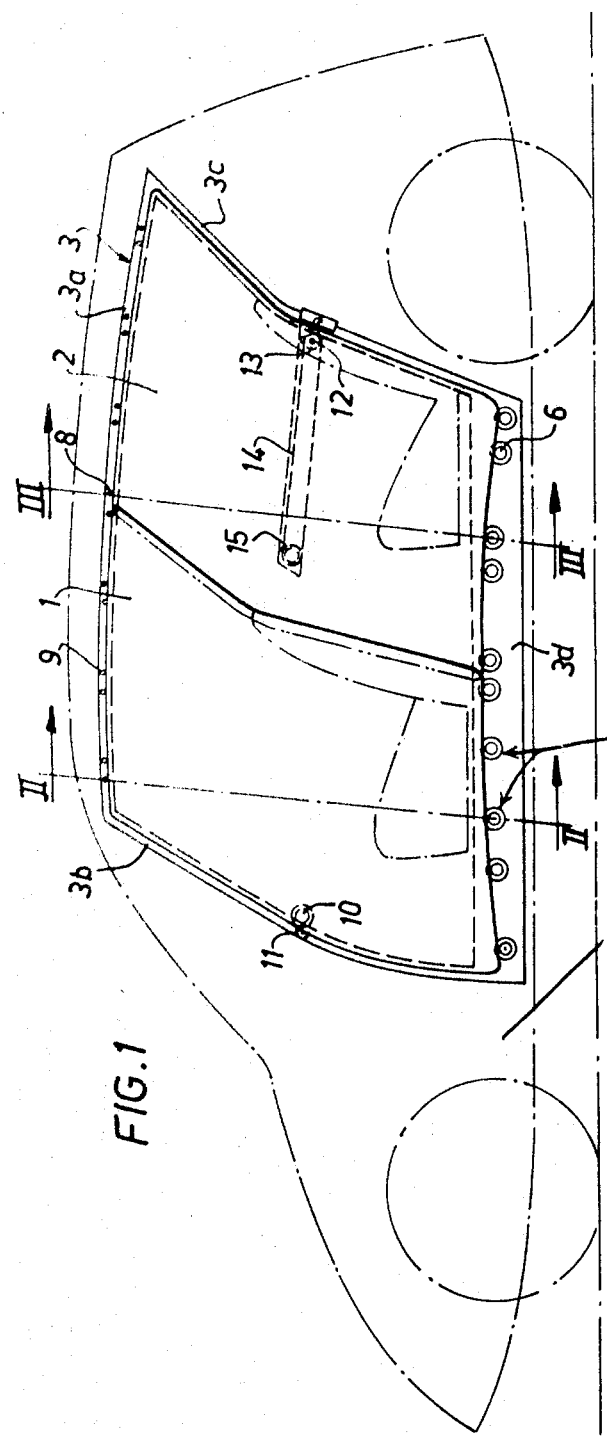
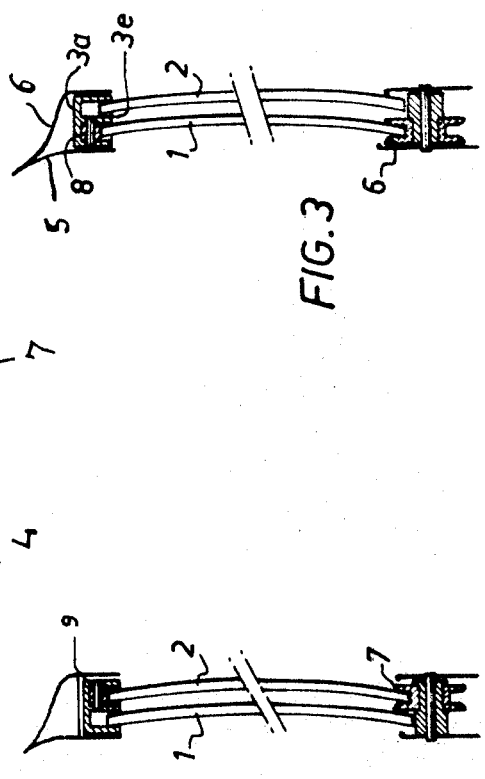

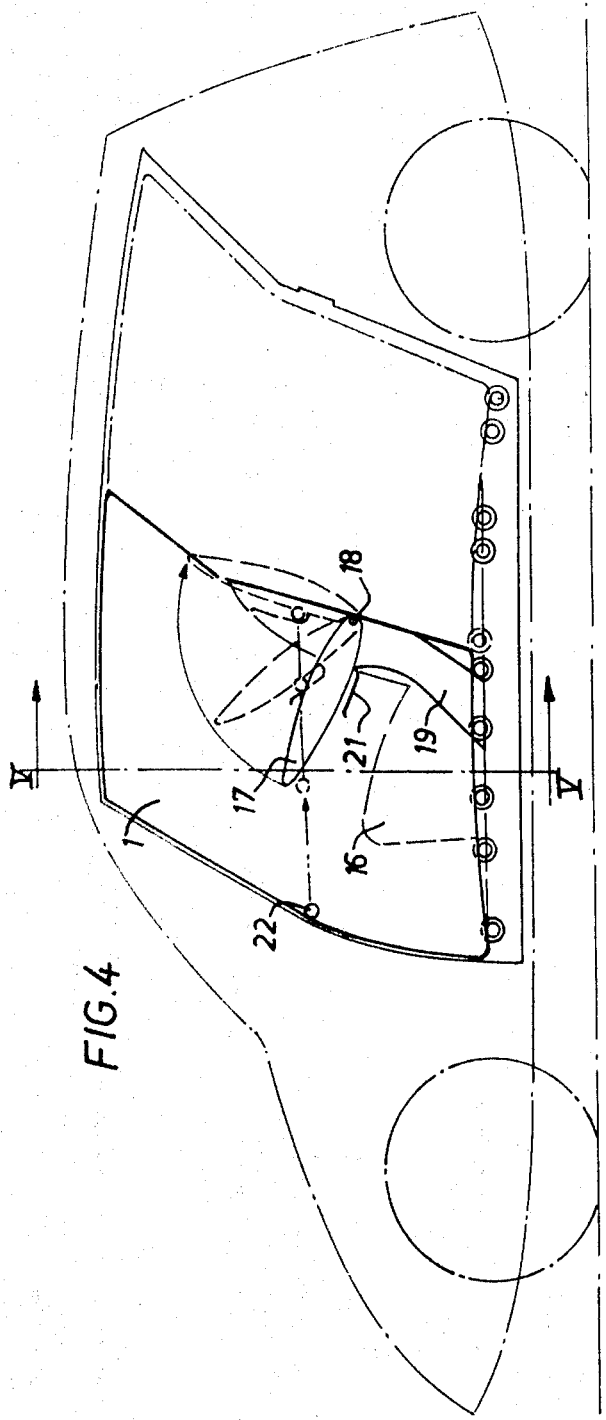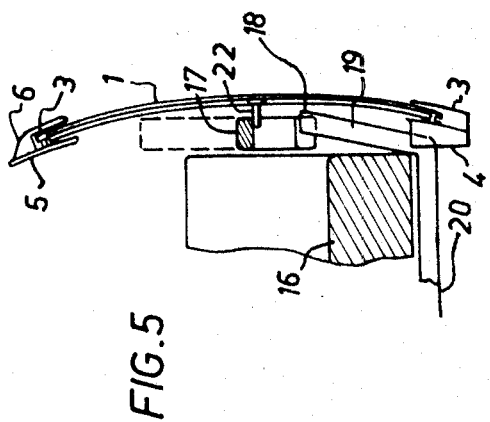

VEHICLES WITH SLIDING DOORS

The present invention relates to improvements in vehicles with sliding doors.

In accordance with one feature of the invention the sliding door or doors for each side of the vehicle are movable in a frame which is manufactured independently of the body of the vehicle and which is fixed to said body after having been equipped with runners for the doors, and possibly with the doors in situ. These doors will preferably be made of a transparent material.

By means of this improvement, accurate manufacture is possible because of the relative simplicity of the frame; the external stresses to which the bodywork is submitted during the course of its manufacture have no injurious effect upon the frame and consequently on the operation of the doors. The assembly and positioning of the doors and their latches are operations which are facilitated and improved by the fact that it is possible to design and make the frame and its fittings in specialized workshops quite separately from the principal production line for the vehicle. The efficiency of the main production line is thus improved. The decentralization of the operations prevents work stations from becoming overburdened and the fact that the doors and their frames are initially omitted facilitates access to the interior of the vehicle body for internal work during its manufacture. The risk of damage to or staining of the door frames and their fittings is thus reduced. Any parts of the door which are damaged by accident can more easily be replaced and repairs are thus simplified.

According to the invention there is provided a method of manufacturing a vehicle provided on at least one side thereof with a sliding door, the method comprising manufacturing a hollow quadrilateral frame, in which the door is slidable when engaged between upper and lower horizontal side members of the frame of channel section, separately from the manufacture of the body and roof of the vehicle, and securing the completed frame to the body and roof of the vehicle so that the door is slidable in the frame to open and close an access aperture in the vehicle body surrounded by the frame.

The method may comprise locating two sliding doors in the same quadrilateral frame the interiors of the upper and lower horizontal members of which are divided longitudinally by respective central walls on opposite sides of which the two doors are located so that each door is slidable to an open position in which it covers the other door.

The upper horizontal member may be bowed to be of the same convex configuration as the roof along the line of junction of the upper member and roof; the or each door may be of shallowly convex shape and the shape of the lower horizontal member is such that the distance between the upper and lower horizontal members is substantially constant throughout their lengths.

According to another feature of the invention there is provided a hollow, quadrilateral frame separately manufactured for use in the method described in the three previous paragraphs and comprising rotatable runners located in each horizontal member of channel section to engage the upper and lower edge of the or each door slidable in said frame. The or each door may be of transparent material.

According to yet another feature of the invention there is provided a vehicle having a sliding door movable to open and close an aperture in the vehicle body adjacent and in front of a seat located on the floor of the vehicle, wherein an armrest is pivotally mounted near its rearward end on a fixed part of the vehicle between the door and seat which fixed part prevents downward movement of the free end of the arm below a predetermined, normal position of the arm, and wherein the door has a projection extending inwardly of the vehicle positioned so as to engage the underside of the armrest as the door is moved from its closed to its open position, the arrangement being such that as the door reaches its fully opened position it rotates the armrest to a fully lifted position and such that the armrest is fully disengaged by said projection before the door reaches its fully closed position.

There is preferably secured to the underside of the armrest a member forming with said underside a fork which said projection enters as the armrest moves toward its lifted position, said member engaging said projection to ensure downward movement of the armrest from its lifted to its normal position as the door is moved from its opened toward its closed position.

Said fixed part may be a pillar upstanding from and integral with the floor of the vehicle, the top of the pillar serving as a seat on which the armrest lies in its normal position and the pivotal connection of the armrest to the pillar being to the rear of said seat.

A preferred embodiment of the invention will now be described with reference to the accompanying diagrammatic drawings, in which:

FIG. 1 is an elevational view of one side of a vehicle,

FIG. 2 is a vertical sectional view of said side of the vehicle taken on the line II–II of FIG. 1, FIG. 3 is a vertical sectional view of said side of the vehicle taken on the line III–III of FIG. 1, FIG. 4 is a view similar to that of FIG. 1 but showing an armrest and means for raising and lowering the same, and FIG. 5 is a vertical sectional view taken on the line V–V of FIG. 4.

The vehicle illustrated in FIG. 1 is provided on each side with two sliding doors 1 and 2, which are made of a transparent material. Since the two doors and their associated frame 3 are identical on both sides of the vehicle the frame and doors on the side of the vehicle remote from that illustrated in FIG. 1 are omitted from FIGS. 2 and 3 for the sake of clarity. These doors 1 and 2 are shallowly convex as shown but they may be flat or of any other configuration.

The doors 1 and 2 are slidable in a hollow quadrilateral frame 3 which is manufactured separately from the remainder of the vehicle and which, after having been equipped with rotatable rollers 6, 7, 8 and 9 in its channel-section horizontal members 3a and 3d is fixed, for example by welding, to the associated side of the body 4 and to the roof 5 so as to surround an access aperture in the body opened and closed by the sliding doors. A weather strip 60 secured to the roof 5 conceals the top horizontal member 3a of the frame. As the drawing shows, the member 3a of the frame 3 is bowed so that it has the same contour as the roof 5 along the line of junction between the roof and frame. The front and rear upright members 3b and 3c of the frame extend upwardly and rearwardly. The lower horizontal member 3d of the frame is as nearly as possible horizontal, but is so shaped that the separation between it and the upper horizontal member 3a is constant throughout their lengths. The doors 1 and 2 slide on runners 6' and 7 which are rotatably mounted inside the channel-shaped bottom member 3d of the frame. At their top edges they are engaged inside the inverted channel-shaped member 3a of the frame, being separated from one another by being positioned on opposite sides of a longitudinal wall 3e, dividing the interior of the channel 3a and being guided by runners 8 and 9. The rotary axes of the runners 6 and 7 are located in relation to the runners 8 and 9 so that the doors, in sliding, are gripped between the resilient runners, only the degree of play necessary to proper operation being permitted.

Near the front edge of the front door 1, there is pivotally mounted at 10 a latch member 11 which can engage an aperture suitably located in the lateral member 3b of the frame. In a similar way, a latch 12 is pivotally mounted at 13 near the rear edge of the rear door 2 and engages an aperture in the lateral member 3c of the frame. Rotation of the latch 12 is remotely controlled by an operating member 15 mounted nearer to the forward edge of the back door 2. The latch 12 is spring loaded to the operative position from which it is displaceable by a wire 14 connecting it to the operating member 15.

At 16 (FIG. 4), one of the front seats of the vehicle can be seen. Between this seat and the door 1, which opens and closes the access aperture of the body adjacent and in front of the seat 16, an armrest 17 is pivotally mounted at 18 to the rear of a pillar 19 fixed to the floor 20 of the vehicle body. The top of the pillar 19 is designed as a seating or abutment which supports the armrest 17 when the latter is in its normal, slightly upwardly inclined position.

A member 21 is fixed to the underside of the armrest 17 as shown, but, in a variant embodiment, may be arranged on the side of the armrest.

The door 1, in the neighborhood of its front edge, carries an internally projecting finger 22 which is located slightly lower than the free end of the armrest 17, when the latter is in its normal position.

When the door 1 is slid rearward from its closed to its open position, the finger 22 abuts the underside of the armrest 17 and lifts it up. During this movement, the finger slides beneath the bottom face of the armrest and engages, during the latter part of its travel, in the fork formed between the underside of the armrest and the member 21. When the door is completely open, the armrest is held in a fully lifted position, as shown in broken lines in FIG. 4.

When the door 1 is returned to the closed position, the member 21 is engaged by the finger 22 which causes the armrest 17 to swing forward about its pivotal axis 18 to the rear of the top of the pillar. When the finger has left the fork, the armrest continues to swing down under gravity, resting on the finger 22 until it is supported in its normal position by the top of the pillar 19.

I claim:

1. A vehicle comprising a body having two sidewalls, a seat mounted therebetween and an aperture in one of said walls adjacent and in front of said seat; a sliding door movable to open and close said aperture; an elongated armrest extending generally longitudinally of said vehicle and pivotally mounted near a rearward end of the armrest on said body between said door and said seat for pivotal movement of the armrest upwardly and downwardly, said armrest being constrained against downward movement of the free forward end thereof below a predetermined normal position of said armrest; and a projection on said door extending inwardly of the vehicle and positioned so as to engage said armrest from below as said door is moved from its closed to its open position, said projection and said armrest being so constructed and arranged that, as said door reaches a fully opened position, it rotates said armrest to a fully lifted position and, when said door reaches a fully closed position, said armrest is fully disengaged by said projection.

2. The vehicle defined in claim 1, further comprising a member secured to the underside of the said armrest and forming a fork therewith receiving said projection as the armrest moves toward said lifted position, said member engaging said projection for downward entrainment of said armrest toward said normal position as said door is moved from said opened position toward said closed position.

3. The vehicle defined in claim 1 wherein said body comprises a pillar upstanding from and integral with the floor of said body, said pillar having a top serving as an abutment for said armrest in said normal position, said armrest being pivotally secured to said pillar rearwardly of said abutment.